United States Patent [19]

Gellert

[11] Patent Number: 4,836,766
[45] Date of Patent: Jun. 6, 1989

[54] INJECTION MOLDING VALVE GATING ONE OF TWO NOZZLES IN TANDEM

[76] Inventor: Jobst U. Gellert, 7A Prince Street, Georgetown, Ontario, Canada, L7G 2X1

[21] Appl. No.: 187,445

[22] Filed: Apr. 28, 1988

[30] Foreign Application Priority Data

Apr. 13, 1988 [CA] Canada .................. 563980

[51] Int. Cl.⁴ .............................. B29C 45/22
[52] U.S. Cl. ..................... 425/549; 425/562; 425/563; 425/564; 425/566; 425/567; 425/568; 425/570; 425/571
[58] Field of Search ............... 425/547, 549, 562, 563, 425/564, 566, 574, 588, 567, 568, 570, 572

[56] References Cited

U.S. PATENT DOCUMENTS

| | | | |
|---|---|---|---|
| 3,758,248 | 9/1973 | Drazick | 425/563 |
| 4,010,903 | 3/1977 | Sakuri et al. | 425/563 |
| 4,125,352 | 11/1978 | Gellert | 425/566 |
| 4,403,405 | 9/1983 | Gellert | 29/611 |
| 4,406,609 | 9/1983 | Gellert | 425/566 |
| 4,643,664 | 2/1987 | Yoshida | 425/549 |

Primary Examiner—Jay H. Woo
Assistant Examiner—Timothy W. Heitbrink
Attorney, Agent, or Firm—Riches, McKenzie & Herbert

[57] ABSTRACT

This invention relates to an injection molding system having an axially aligned forward and rearward heated nozzle mounted in tandem. The rearward nozzle is seated in a fixed position, while the forward nozzle reciprocates between a retracted open position and a forward closed position to provide valve gating. The forward nozzle has a rearwardly extending sleeve portion which projects into the rearward nozzle to connect the melt bores of the nozzles as the forward nozzle reciprocates. The forward nozzle has a heated nose portion with a tip which seats in the gate in the closed position. A pneumatically actuated piston bears against the rear end of the forward nozzle to drive it to the closed position. Injection melt pressure around the nose portion drives the forward nozzle back to the open position.

3 Claims, 2 Drawing Sheets

INJECTION MOLDING VALVE GATING ONE OF TWO NOZZLES IN TANDEM

BACKGROUND OF THE INVENTION

This invention relates generally to injection molding and more particular to an injection molding system having heated nozzles mounted in tandem, the rearward one being fixed in place and the forward one reciprocating between open and closed positions to provide valve gating.

Heated nozzles are well known in the art, and valve gating is usually provided by a valve pin driven by actuating mechanism to reciprocate in a central bore in the nozzle. When molding certain materials it is desirable to provide additional heat to the gate area to facilitate closing of the gate. In the past, this has been done by providing a valve pin of which a portion is formed by a "heat pipe" as disclosed in the applicant's U.S. Pat. No. 4,125,352 entitled "Thermal Valve Pin" which issued Nov. 14, 1978. Another solution to this problem is to improve the conductivity of the valve pin by filling it with copper, as described in the applicant's U.S. Pat. No. 4,406,609 entitled "Valve Pin and Method of Manufacture" which issued Sept. 27, 1983. However, these previous conductive valve pins have the disadvantages that they are relatively costly to make, do not provide accurate temperature control and do not provide sufficient heat as in the gate area for some applications the nozzle. A multi-cavity system in which a number of nozzles having a pointed tip are secured to a common manifold and reciprocated together is shown in the applicant's Canadian patent application Ser. No. 542,182 entitled "Injection Molding Multiple Nozzle Valve Gating System" which was filed July 15, 1987. A single cavity system in which one nozzle is valve gated by rotating a collar is shown in the applicant's Canadian patent application Ser. No. 554,730 entitled "Injection Molding Single Nozzle Valve Gating" filed Dec. 17, 1987. While this arrangement is suitable for certain applications, it is relatively complex and costly to make.

The applicant's copending Canadian patent application Ser. No. 563,982 entitled "Injection Molding System with Nozzles in Tandem" discloses the concept of mounting two heated nozzles axially in tandem. Mounting a piston to drive the forward nozzle with a heated nose portion leading to a tip from a retracted open position to a forward closed position provides a combination of heat and pressure at the gate to form a clean gate when molding with crystaline materials.

SUMMARY OF THE INVENTION

Accordingly, it is an object of the present invention to at least partially overcome the disadvantages of the prior art by providing a valve gated injection molding system having two heated nozzles mounted in tandem with the rearward nozzle fixed in position and the forward nozzle being axially reciprocal and having a heated nose portion.

To this end, in one of its aspects, the invention provides an injection molding valve gated system comprising a forward first elongated heated nozzle mounted in a well in a cavity plate for reciprocal motion in an axial direction, the first nozzle having a rear end, a nose portion leading to a tip at a forward end which is in axial alignment with a gate extending from the well to a cavity, and a melt bore extending therethrough, having a central portion and a diagonal portion, the central portion extending from an inlet at the rear end and the diagonal portion extending from the central portion to a sealed space surrounding the nose portion leading to the gate, the first nozzle having an integral heating element, a portion of which extends into the nose portion of the first nozzle, actuating means adjacent the first nozzle to drive the first nozzle axially from a retracted open position to a forward closed position wherein the tip of the nose portion is seated in the gate, and a rearward second elongated heated nozzle having a rear end, a forward end, and a central melt bore extending therethrough from an inlet at the rear end to the forward end, the second nozzle being seated in a support plate in a fixed position axially adjacent the first nozzle wherein the central bore is in axial alignment with the central portion of the melt bore through the first nozzle, one of the rear end of the forward nozzle and the forward end of the rearward nozzle having an extended portion which is received by the other, whereby the central portion of the melt bore through the first nozzle remains continuous with the central melt bore through the second nozzle as the first nozzle reciprocates between the first and second positions.

Further objects and advantages of the invention will appear from the following description, taken together with the accompanying drawings.

DETAILED DESCRIPTION OF THE DRAWINGS

Figure 1:
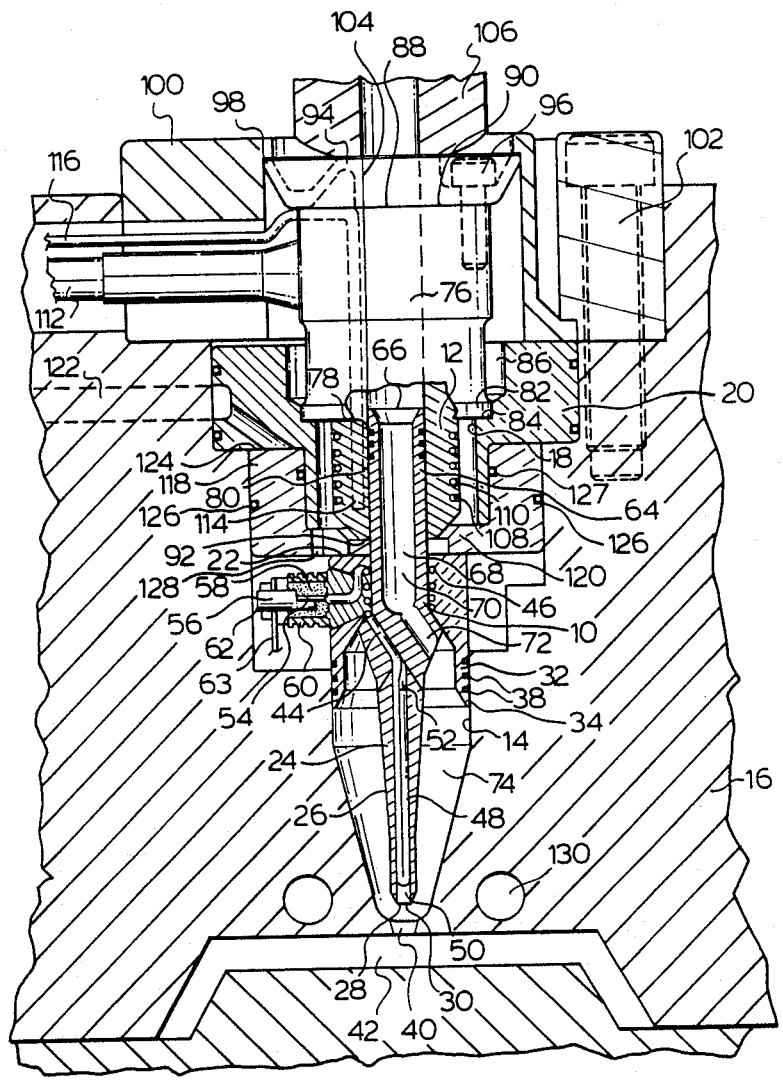
FIG. 1 is a sectional view of a portion of an injection molding system having two nozzles mounted in tandem according to a preferred embodiment of the invention, showing the forward nozzle in the retracted open position.

In this embodiment, a forward elongated heated nozzle 10 and a rearward elongated heated nozzle 12 are mounted axially in tandem with the forward nozzle 10 reciprocally mounted in a well 14 in a cavity plate 16 and the rearward nozzle 12 seated in a well 18 in a support plate 20. Of course, depending upon the mold configuration, there can be additional plates and/or the plates can have different shapes, but the mounting of the nozzles 10,12 remains the same. Similarly, while a single cavity system is shown, this invention is also applicable to a multi-cavity system having a heated manifold to distribute melt to a number of sets of nozzles mounted in tandem.

Figure 2:
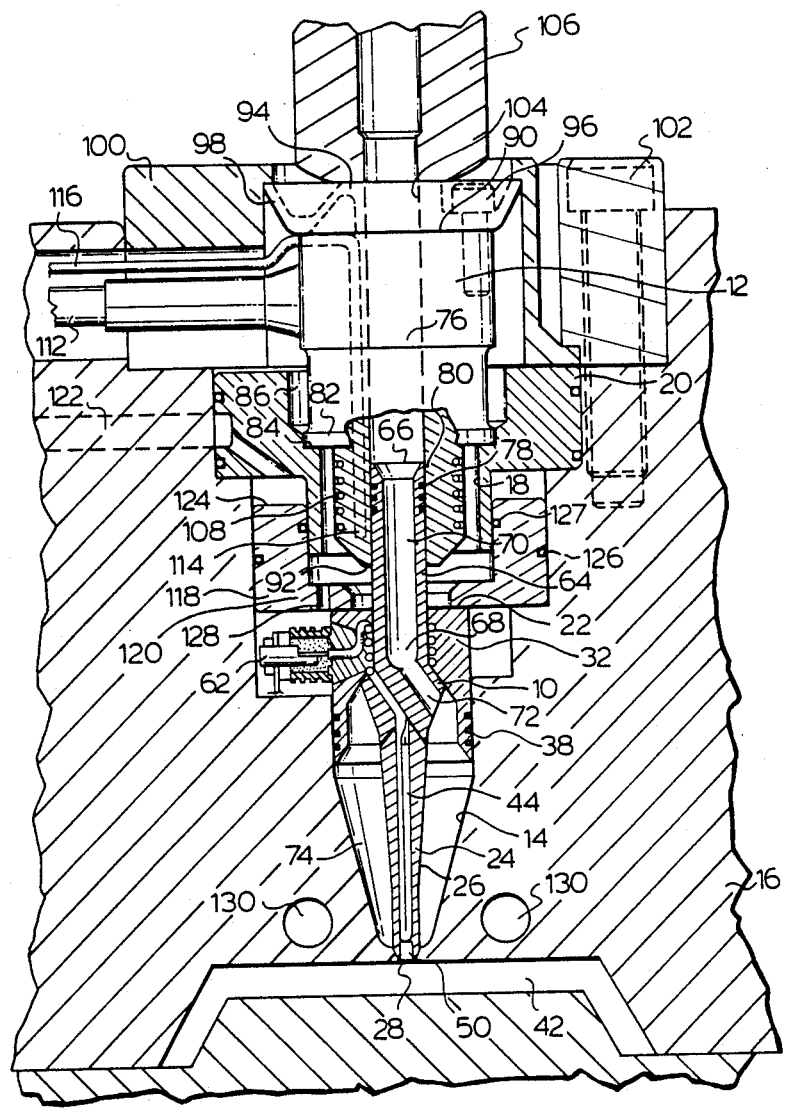
FIG. 2 is a similar view showing the forward nozzle in the forward closed position with the tip of the nose portion seated in the gate.

The forward nozzle 10 is made with a rear end 22 and a nose portion 24 with a tapered outer surface 26 leading to a tip 28 at the forward end 30 as described in the applicant's Canadian patent application Ser. No. 549,518 filed Oct. 16, 1987 entitled "Injection Molding Nozzle Having Grounded Heating Element Brazed into Pointed Tip". However, in this case the forward nozzle 10 has an enlarged collar portion 32 with an outer surface 34 which fits inside the inner surface 36 of the well 14. As can be seen, sealing grooves 38 are provided in the outer surface 34 of the collar portion 32 to prevent leakage of pressurized melt between it and the surrounding surface 36 of the well 14 as the forward nozzle reciprocates between the open position shown in FIG. 1 and the closed position shown in FIG. 2 in which the tip 28 of the nose portion 24 is seated in a gate 40 leading to the cavity 42. During use, these grooves 38 gradually fill with plastic which carborizes and prevents leakage past them.

The forward nozzle 10 is heated by an electric heating element 44 which is described in detail in the applicant's Canadian patent application Ser. No. 563,981 filed Apr. 13, 1988 entitled "Injection Molding Nozzle Having Multiple Thickness Heating Element and Method of Manufacture". The heating element 44 has a helical portion 46 and a multiple thickness longitudinal portion 48 which extends centrally in the nose portion 24 to an air-hard tool steel insert portion 50 which forms the tip 28. In this embodiment, the heating element 44 has a single resistance wire 52 which is grounded by being brazed in a nickel alloy. The rear end 54 of the heating element 44 extends radially outward through the collar portion 32 of the nozzle and is connected to a threaded stud 56. The larger diameter stud 56 is surrounded by ceramic insulation 58 inside a cylindrical sleeve 60 to form a cold terminal 62, as described in detail in the applicant's Canadian patent application Ser. No. 549,520 filed Oct. 16, 1987 entitled "Method of Manufacture of Injection Molding Nozzle Electrical Terminal." The cold terminal 62 receives a lead 63 from an external power supply from which current flowing through to the ground heats the nozzle 10 and particularly the tip 28 of the nose portion 24 to a predetermined temperature.

In this embodiment, the rear end 22 of the forward nozzle 10 has a central hollow sleeve portion 4 which extends rearwardly to an open mouth 66. Thus, the melt bore 68 which extends through the forward nozzle 10 has a central portion 70 which extends from the mouth 66 and a diagonal portion 72 which extends from the central portion 70 to a space 74 which surrounds the nose portion 24 leading to the gate 40 and is sealed against leakage by the sealing grooves 38.

As can be seen, the rearwardly extending sleeve portion 64 of the forward nozzle 10 projects into the central melt bore 76 of the rearward nozzle 12, and has similar circumferentially extending sealing grooves 78 seated in its outer surface 80 to prevent leakage. The rearward nozzle 12 has an insulation flange 82 which seats on a circumferential shoulder 84 of the support plate 20 to securely and accurately locate the nozzle 12 in a fixed position with an insulative air space 86 between it and the surrounding support plate 20. In this position, the central bore 76 of the rearward nozzle which extends from an inlet 88 at the rear end 90 to the forward end 92 is in axial alignment with the central portion 70 of the melt bore 68 through the forward nozzle 10. Thus, when the forward nozzle 10 reciprocates between the open and closed positions, the rearwardly extending sleeve portion slides inside the central melt bore 76 of the rearward nozzle 12 without jamming. While the forward end 92 of the rearward nozzle 12 is adjacent the rear end 22 of the forward nozzle 10 in the open position shown in FIG. 1, sufficient space is provided between them to allow for thermal expansion of the rearward nozzle 12. The rearward nozzle 12 is held securely in this position by a steel backplate 94 which is fastened to the rear end 90 by bolts 96 and has a relatively thin flanged portion 98 which extends outwardly and rearwardly to bear against a retaining collar 100. The retaining collar is, in turn, secured to the cavity plate 16 by bolts 102. As described in the applicant's Canadian patent application Ser. No. 557,681 filed Jan. 29, 1988 entitled "Improved Mounting for Injection Molding Nozzle", this arrangement reduces heat loss from the nozzle 12 to the retaining collar 100. The backplate 94 has a central melt bore 104 extending therethrough in alignment with the central melt bore 76 through the rearward nozzle 12 to receive pressurized melt from the nozzle 106 of a molding machine.

The rearward nozzle 12 also has an integral electrical heating element 108 and can, for instance, be made by the methods described in the applicant's U.S. Pat. No. 4,403,405 which issued Sept. 13, 1983 entitled "Sprue Bushing Connector Assembly and Method" and the applicant's Canadian patent application Ser. No. 532,677 filed Mar. 20, 1987 entitled "Injection Molding Nozzle and Method". The heating element 108 has a helical portion 110 which extends around the central melt bore 76 and a rear portion which extends radially outward to a cold terminal 112 which receives electrical power from an external source. A thermocouple 114 with an outwardly extending lead 116 is provided to monitor the temperature adjacent the forward end 92 of the rearward nozzle 12.

The forward nozzle 10 is driven from the retracted open position to the forward closed position by a pneumatically actuated ring piston 118 which is mounted in the cavity plate 16 around the rearward nozzle 12. The piston 118 has a flanged portion 120 which extends inwardly to bear against the rear end 22 of the forward nozzle 10. A controlled source of pressurized air is connected to an air duct 122 which extends to apply pneumatic pressure to the rear end 124 of the piston 118. The piston 118 has piston rings 126,127 which provide a pneumatic seal as the piston reciprocates. The inwardly flanged portion 120 has small holes 128 therethrough to equalize the air pressure on both sides when the piston reciprocates.

In use, after the injection molding system has been assembled as shown and described above, electrical power is applied to the heating elements 44 and 108 to heat both nozzles 10 and 12 to a predetermined operating temperature. Pressurized melt is introduced from the molding machine nozzle 106 to the inlet 88 to the central bore 76 in the fixed rearward nozzle 12 and it flows into the mouth 66 of the melt bore through the forward nozzle 10 to the space 74 around the nose portion 24. The force of the melt back pressure against the forward nozzle 10 in the larger nozzle well 14 drives the forward nozzle to the retracted open position, and the melt flows through the gate 40 and fills the cavity 42. The space 74 remains filled with melt, some of which solidifies adjacent the cavity plate 16 in the area cooled by cooling water flowing through cooling conduits 130.

After the cavity 42 is full, injection pressure is held momentarily to pack and then released. Then air pressure from the external source of about 100 psi is applied to the piston 118 through the air duct 122. The piston bears against the rear end 22 of the forward nozzle 10 and drives it to the closed position with the tip 28 of the nose portion 24 seated in the gate 40. For some difficult to mold materials such as high crystaline materials, the combination of the closing force from the piston 118 and the heat provided by the longitudinal portion 48 of the heating element 44 to the tip 28 "burns" the tip 28 into a tightly closed position in the gate 40 to provide a good clean gate. After a short cooling, the mold is opened to eject the product. After ejection the mold is closed and injection pressure is reapplied from the injection machine nozzle 106. This cycle is repeated continuously with a frequency dependent on the size and shape of the cavity and the type of material being molded.

While the description of this system and its use have been given with respect to a preferred embodiment, it is not to be construed in a limiting sense. Variations and modifications will occur to those skilled in the art. For instance, rather than having the sleeve portion 64 extend from the rear end 22 of the forward nozzle 10 into the central melt bore 76 of the rearward nozzle 12, a sleeve portion can extend from the forward end 92 of the rearward nozzle 12 into the central portion 70 of the melt bore 68 through the forward nozzle 10. The configurations of the mold and the forward and rearward nozzle 10,12 may vary depending upon the particular application. Reference is made to the appended claims for a definition of the invention.

What I claim is:

1. An injection molding valve gated system comprising:
   (a) a forward first elongated heated nozzle mounted in a well in a cavity plate for reciprocal motion in an axial direction, the first nozzle having a rear end, a nose portion leading to a tip at a forward end which is in axial alignment with a gate extending from the well to a cavity, and a melt bore extending therethrough, having a central portion and a diagonal portion, the central portion extending from an inlet at the rear end and the diagonal portion extending from the central portion to a sealed space surrounding the nose portion leading to the gate, the first nozzle having an integral heating element, a portion of which extends into the nose portion of the first nozzle,
   (b) piston actuating means adjacent the first nozzle to drive the first nozzle axially from a retracted open position to a forward closed position wherein the tip of the nose portion is seated in the gate, and
   (c) a rearward second elongated heated nozzle having a rear end, a forward end, and a central melt bore extending therethrough from an inlet at the rear end of the rearward nozzle to the forward end of the rearward nozzle, the second nozzle being seated in a support plate in a fixed position axially adjacent the first nozzle wherein the central bore of the second nozzle is in axial alignment with the central portion of the melt bore through the first nozzle, one of the rear end of the forward nozzle and the forward end of the rearward nozzle having an extended portion which is received by the other, whereby the central portion of the melt bore through the first nozzle remains continuous with the central melt bore through the second nozzle as the first nozzle reciprocates between the first and second positions.

2. An injection molding system as claimed in claim 1 wherein the rear end of the forward nozzle has a rearwardly extending central portion in the form of a hollow sleeve portion having an open mouth through which the central portion of the melt bore extends, the sleeve portion extending into the central bore of the second nozzle from the forward end and being slidably received therein to convey pressurized melt from the first nozzle to the second nozzle without appreciable leakage therebetween as the first nozzle reciprocates.

3. An injection molding system as claimed in claim 1 comprising a plurality of first and second nozzles mounted in tandem and further comprising a heated manifold having a melt passage extending from an inlet to a plurality of outlets, the manifold being mounted adjacent the rear end of each of the rearward nozzles with one outlet in alignment with the inlet to each rearward nozzle to provide a multi-cavity system.

* * * * *